United States Patent [19]

Schmucker

[11] Patent Number: 4,968,980
[45] Date of Patent: Nov. 6, 1990

[54] ELECTRONIC PROXIMITY FUSE RESPONSIVE TO TWO SIGNALS

[75] Inventor: Georg Schmucker, Ulm/Donau, Fed. Rep. of Germany

[73] Assignee: Telefunken Systemtechnik GmbH, Ulm/Donau, Fed. Rep. of Germany

[21] Appl. No.: 255,705

[22] Filed: Feb. 1, 1963

[30] Foreign Application Priority Data

Feb. 3, 1962 [DE] Fed. Rep. of Germany ....... T 21523 Ic/72i

[51] Int. Cl.$^5$ ...................... G01S 13/42; G01S 13/34; F42C 13/04
[52] U.S. Cl. .................................... 342/68; 342/109; 102/214

[58] Field of Search ................. 102/70.2, 70.2 P, 214; 343/8, 14, 7, 17.2, 13, 17.5, 7 PF, 9; 342/68, 109, 122, 128

[56] References Cited

U.S. PATENT DOCUMENTS 2,454,673 11/1948 Sanders, Jr. .......................... 342/61

Primary Examiner—Gilberto Barron, Jr.
Attorney, Agent, or Firm—Spencer & Frank

[57] ABSTRACT

An electronic proximity fuse of the FM radar type having a detonating circuit with two inputs. One input is derived from a signal representing the amount by which the frequency of the received signal differs from the frequency of the transmitted signal at the instant of reception averaged over the frequency-modulation period. The second input is derived from a signal proportional to the amount of the frequency fluctuations of the frequency deviation about the averaged amount.

19 Claims, 4 Drawing Sheets

ELECTRONIC PROXIMITY FUSE RESPONSIVE TO TWO SIGNALS

The present invention relates to electronic proximity fuses.

More particularly, the present invention relates to an electronic proximity fuse of the type carried by an uncontrolled or remotely controlled projectile such as a shell, bomb, or guided missile. The projectile or missile may, for example, be shot from an artillery piece such as a gun or mortar, or other high-angle firing device, or the projectile may be a missile launched under its own power, or be dropped from an aircraft.

Existing electronic proximity fuses operate as follows:

A small dipole antenna located at the head of the missile emits a constant high-frequency output of about 10 to 100 milliwatts. The signal put out by the antenna is reflected by the target, as, for example, the ground, and the received reflected signal, whose frequency will differ from that of the transmitted signal by the Doppler frequency, is mixed with a portion of the transmitted energy thereby to obtain the Doppler frequency. As soon as the amplitude of the Doppler frequency reaches a given magnitude, the circuit produces an output signal which triggers or detonates the explosive charge carried by the missile.

The above-described electronic proximity fuse has a number of substantial disadvantages:

(1) The distance from target at which each fuse is preset to explode will of necessity be an approximation based on the average amplification factor of each of the several component parts of each fuse, it being understood that the amplification factor of the various amplifiers will vary from fuse to fuse.

(2) The coefficient of reflection determines the reflected energy and thus has a direct influence on the amplitude of the received signal. Inasmuch as existing fuses detonate the war head of the projectile when a certain amplitude threshold is reached, this coefficient of reflection and the distance from target at which the fuse is triggered are directly proportional to each other. Experience has shown that the coefficient of reflection will fluctuate by a factor of up to 5.

(3) The configuration of the target, such as hills and dips in the terrain, will affect the dispersion or focussing of the signal being sent out by the missile, and this, too, will affect the distance from target at which the Dopper frequency will reach its predetermined amplitude.

(4) The angle at which the transmitted signal impinges upon the target will, due to the directivity pattern of the antenna, vary the distance from target at which the fuse will trigger by a factor of up to 1.5.

(5) An enemy jamming transmitter, or any other sufficiently powerful high-frequency transmitter which happens to be operating near the transmitted frequency, can simulate the Doppler frequency and therefore prematurely trigger the fuse long before the projectile carrying the fuse is sufficiently close to the target.

The above disadvantages could be avoided by using a frequency modulation system, such as is used for measuring the altitude of aircraft, so that the response criterion of the fuse would then no longer be the amplitude of a signal but a predetermined frequency. However, even frequency-modulated proximity fuses are still vulnerable to electronic countermeasures, i.e., enemy transmitters which send out frequencies intended to simulate the Doppler signal.

According to another arrangement for reducing the vulnerability of the fuse to electronic counter-measures, the oscillator which generates the electromagnetic waves is provided with means for continuously changing its frequency, wherein the average of the cyclically repeated transmitted frequencies is located outside of the range of the expected beat or Doppler frequency. The frequency variation can be linear, sinusoidal, triangular, or may follow any suitable function, as, for example, a non-periodic program obtained by means of sweep or trigger circuits producing the frequency control, which, in a statistically random manner, will be small deviations from the individual wobble period, the term "wobble period" being the reciprocal repetition frequency of the transmitter frequency variation.

Existing proximity fuses respond, for example, as soon as the amplified voltage of the beat frequency reaches a given amplitude at the output of a low-frequency (LF) amplifier. This has the great disadvantage that a noise frequency which gradually approaches the transmitter frequency likewise causes a beat frequency, thereby causing the fuse to trigger the detonator before the projectile has even begun to approach a target which reflects the transmitted signal.

The transmitter power put out by conventional electronic proximity fuses is generally less than the power put out by enemy jamming transmitters. Also to be considered are the relative magnitudes of the field strengths of the useful and noise signals. On the one hand, the energy of the echo signal, i.e., the signal which is sent out by the fuse circuit and is reflected by the target and received, shifted in frequency by an amount equal to the Doppler frequency, will be very low due to the fact that the usual target has a relatively small coefficient of reflection. On the other hand, the energy put out by an active target transmitter will be high. For example, the power output of a fuse carried by an anti-aircraft shell is generally of the order of 10 milliwatts while the power output of the usual jamming transmitter carried aboard an aircraft is of the order of 100 watts or higher. For this reason alone, conventional anti-jamming measures have been found to be unsatisfactory. A jamming frequency of relatively high power which approaches the average transmitter frequency of the proximity fuse will, despite the above-mentioned anti-jamming means, produce a Doppler frequency whose amplitude is sufficiently large to trigger the fuse. Nor have integrator circuits which delay triggering of the fuse until a plurality of beat frequency oscillations have occurred been found to be particularly effective against electronic counter-measures, because enemy jamming transmitters often have follow-up devices and operate with broad-band signals and frequency wobbling.

It is, therefore, a primary object of the present invention to provide an electronic proximity fuse which overcomes the above-mentioned drawbacks, and, with that object in view, the present invention resides in an electronic proximity fuse circuit comprising means for transmitting frequency-modulated signals and for receiving that portion of the signals which is reflected by a target, and a detonating circuit having two inputs and an output for producing a detonating signal when input signals appear at each of the two inputs. The output of the transmitting and receiving means is connected to means which produce a first signal which is proportional to the amount, averaged over the frequency-modulation period, by which the frequency of the received signal differs from the frequency of the signal transmitted at the instant of reception (this being a measure of the distance between the target and the fuse), and a second signal which is proportional to the amount of the frequency fluctuations of the frequency deviation about the averaged amount (this being a measure of the velocity of the fuse relative to the target), which two signals, when each respective amount represented thereby exceeds a predetermined minimum value, are applied, as input signals, to the two inputs, respectively, of the detonating circuit. Consequently, a detonating signal is produced only when a projectile carrying the fuse, while travelling toward the target, is at a predetermined distance from the target.

Additional objects and advantages of the present invention will become apparent upon consideration of the following description when taken in conjunction with the accompanying drawings in which.

Figure 1:
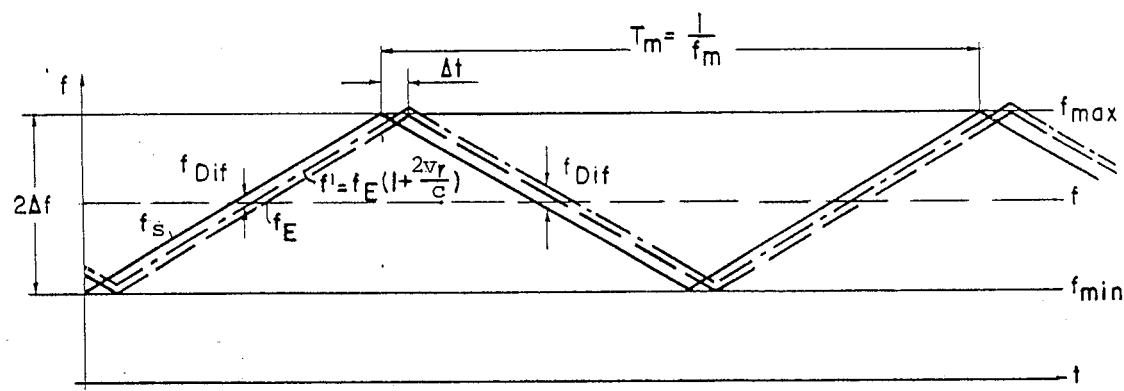
FIG. 1 is a frequency-versus-time plot showing the behaviour of transmitted and received signals.

Referring now to the drawings and to FIG. 1 thereof in particular, the same shows the transmitter frequency $f_s$ of the electronic proximity fuse as a function of time t. The wave shape of $f_s$ is triangular, with an over-all amplitude $2\Delta f$ and a period $T_m = 1/f_m$ ($f_m$ = modulation frequency). Under static conditions, i.e., when the radial velocity of the projectile carrying the fuse circuit relative to the target is equal to zero, the fuse would receive a reflected frequency $f_E$ which is phase shifted with respect to the transmitted frequency $f_s$ by a time interval $\Delta t$ representing the time it takes for an electromagnetic wave to travel from the fuse to the target and back to the fuse. In practice, however, dynamic conditions will prevail, i.e., the projectile carrying the fuse will have a certain radial velocity $v_r$ relative to the target, so that the received frequency $f_E$ will be shifted by an amount corresponding to the Doppler frequency; this, in FIG. 1, is shown by the frequency $f' = f_E \cdot (1 + 2v_r/c)$, where c is the propagation velocity of electromagnetic waves in the medium through which the projectile is travelling (air). As is clearly shown in FIG. 1, the difference frequency $f_{Dif}$ between $f_s$ and $f'$ is, during the ascending portion of the wave shape smaller and during the descending portion of the wave shape larger, than the difference frequency between $f_s$ and $f_E$.

The frequencies $f_{Dif}$ can be measured with a frequency counter, as, for example, a measuring device operating on the capacitor charge and discharge principle and having at its output a fluctuating d.c. voltage. The average d.c. voltage taken over one wobble period $T_m$ represents the distance between the fuse and the target, while the amplitude of the voltage fluctuations occurring with the periodicity $T_m$ represents the relative velocity $v_r$.

Figure 2:
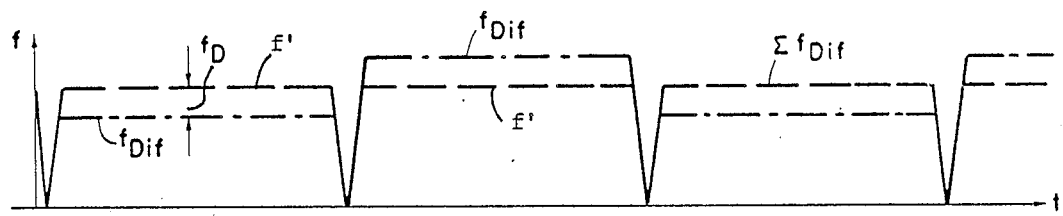
FIG. 2 is a frequency-versus-time plot of frequency functions derived from FIG. 1, drawn on the same time scale as and in geometric alignment with the plot of FIG. 1.

For clarification, reference is made to FIG. 2 which shows the average difference frequencies $\Sigma\ f_{Dif}$, the Doppler frequency shift $f_D$ which is proportional to the radial velocity at which the projectile carrying the fuse moves toward the target which reflects the transmitted frequency, and the difference frequencies $f_{Dif}$ which are different in the ascending and descending portions of the wave shape, as mentioned above.

It is true that there exist Doppler radar apparatus which operate by frequency modulation and are used to determine the distance of targets and the radial speed of the targets, i.e., the speed at which a target reflecting the transmitted energy moves toward or away from the radar set. Such systems should not be confused with the present invention, according to which an electronic proximity fuse is rendered as jam-proof as possible in that the fulfillment of two criteria is required, namely: the fuse is, in a manner of speaking, made ready for firing when the Doppler frequency, in the vicinity of the target, attains a predetermined minimum amplitude, while the actual triggering signal is derived from a distance measurement obtained by a frequency modulation process.

Figure 3:
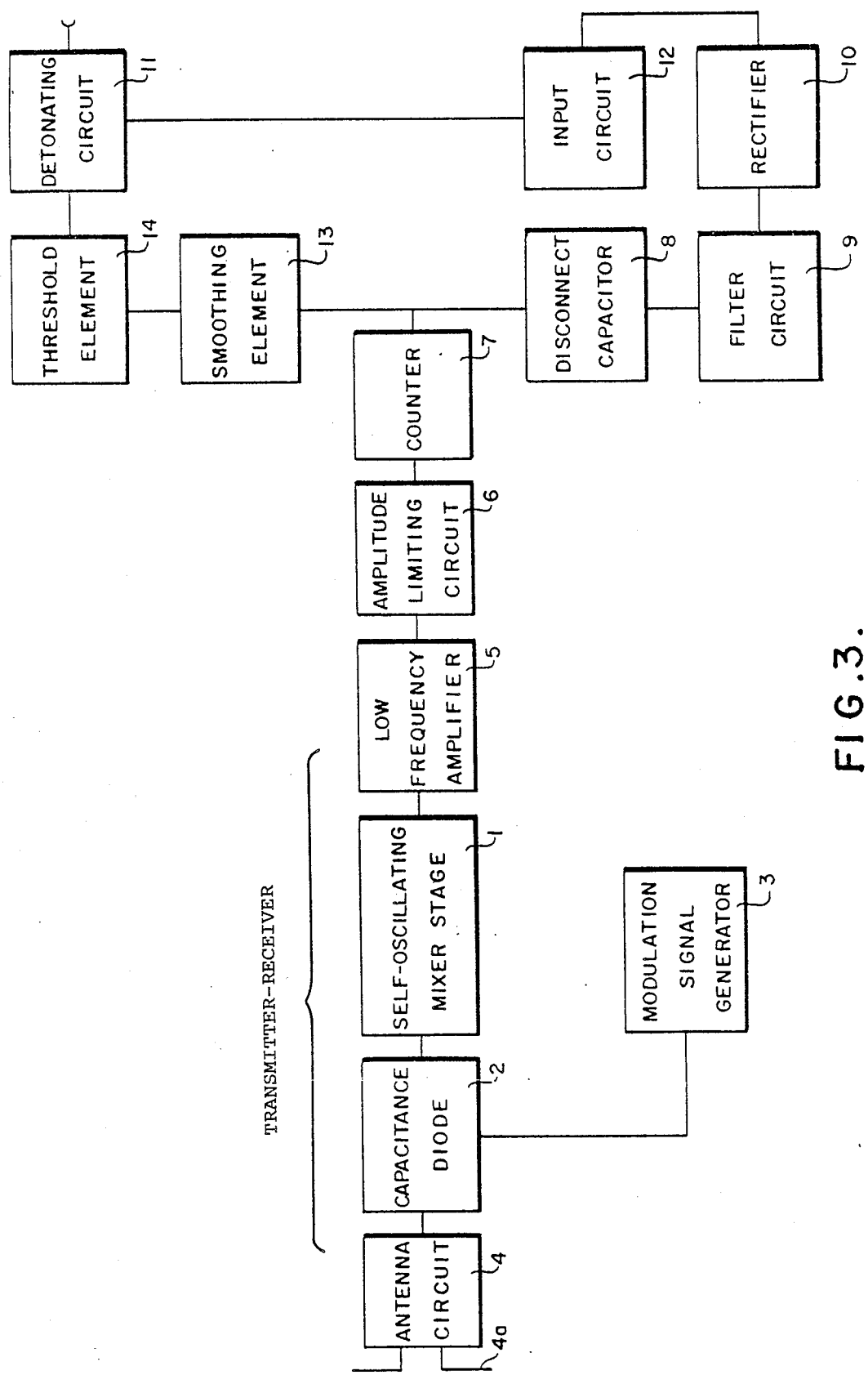
FIG. 3 is a schematic block diagram of an electronic proximity fuse circuit according to the present invention.

FIG. 3 is a schematic block diagram of an electronic proximity fuse according to the present invention. The fuse circuit includes a transmitter receiver which comprises a self-oscillating mixer stage 1 which is connected to a capacitance diode 2, constituting the wobble capacitor, and to the output of a modulation signal generator 3. The output signal transmitted by the antenna circuit 4, the latter being connected to the diode 2, is thus wobbled in dependence of the output signal of the generator 3. This output signal may, for example, have a triangular wave shape. The antenna circuit 4 includes a suitable antenna, such as a dipole 4a, which emits the output signal $f_s$. A portion of the energy sent out by the antenna 4a is reflected by the target and received as frequency f', the latter being phase-shifted with respect to $f_s$ by a time interval $\Delta t$ and having a frequency which differs from that of $f_s$ by the Doppler frequency $f_D$. The received signal f' is mixed with the instantaneous transmitted signal and the difference frequency obtained thereby is amplified in a multiple stage low-frequency (LF) amplifier 5. The circuitry described thus far does not differ substantially from conventional CW/FM-Doppler radar apparatus (CW = continuous wave, FM = frequency modulation), except that, in a proximity fuse according to the present invention, it is particularly advantageous to use, as component 2, a capacitance diode rather than other conventional components and, furthermore, to use a self-oscillating mixer stage, as component 1, instead of separate transmitter and receiver stages. It is also pointed out, in this connection, that the entire circuit is preferably made up of semiconductor elements, i.e., transistors and diodes.

The output of the amplifier stage 5 is applied to the input of an amplitude limiting circuit 6. In lieu of such limiting circuit, a bistable trigger or so-called flip-flop circuit, for example a Schmitt-trigger circuit, can be used which is switched between its states by the amplified difference frequency. The flip-flop circuit gives out output signals which are always of the same amplitude, these signals passing through zero at the same rate at which the difference frequency passes through zero. The output of the amplitude limiting circuit is connected to the input of a counter 7 whose time constant $\tau$ has to be less than half a modulation period, i.e., $\tau < T_m/2$, so that both of the frequencies applied to the counter can be counted separately. If the counter is constituted by a conventional capacitor charge and discharge arrangement, there will appear at the read-out resistance of such an arrangement a pulsating direct current having a pulse repetition frequency equal to the triangular modulation frequency $f_m$, the average value of this direct current being a measure of the distance between the fuse circuit and the target and the amplitude of the fluctuations of the direct current being a measure of the radial velocity of the fuse circuit and target relative to each other. This pulse repetition frequency is applied, via a disconnect capacitor 8 and, if desired, a pass-band filter circuit 9 for eliminating noise, to a rectifier 10. Suitable amplifying means (not shown) will, in practice, be cut ahead of the rectifier 10. As soon as there appears at the output of rectifier 10 a voltage which lies above a predetermined minimum and which is proportional to the radial velocity of the fuse relative to the target, the detonating circuit 11 is prepared for firing, there being, if desired, an input circuit 12 which may be a conventional amplifier containing the detonating capacitor. Due to the relatively short range of the transmitter of the fuse circuit, this capacitor is, within about 10 milliseconds, charged sufficiently to produce an input signal to circuit 11 only when the distance between the target and fuse is of the order of about 20 meters.

The circuit 11 is a coincidence circuit which produces an output signal—here a signal which detonates the explosive charge carried by the projectile—as soon as signals appear at both of its inputs.

A d.c. voltage which is proportional to the average difference frequency is derived by means of a smoothing element 13 which is connected to the output of counter 7. This smoothing element, which may, for example, be a conventional filter circuit, has to integrate over at least one full period $T_m$ so that the true average value will be formed and no noise pulses of short duration will pass through the remainder of this branch circuit on to the other input of the detonating circuit 11. Inasmuch as the modulation frequency $f_m = 1/T_m$ is of the order of several kilocycles, the distance which a projectile carrying the fuse circuit travels, during the time interval $T_m$ is negligibly small, even if the projectile travels at a speed of 1000 meters per second (over 2,000 miles per hour); besides, even this delay can, if deemed necessary, be compensated for. As soon as the output of the smoothing element 13 reaches a predetermined threshold value, a threshold stage 14 applies a signal to the other input of the detonating circuit 11. Since a signal already appears at the other input of circuit 11, the latter produces an output signal which, as mentioned above, is a signal which detonates the explosive charge.

In practice, the detonating circuit 11 may be constituted by a flip-flop circuit which has two combined signal inputs and which is normally in its non-conductive or blocked state. One of the two inputs serves to open the flip-flop, and it is to this input that there is applied the signal which depends on the frequency fluctuations of the frequency deviation about the averaged amount, i.e., the signal coming through the branch 8, 9, 10, 12, which is a measure of the speed of the fuse. The other input has applied to it the signal which is dependent on the averaged amount of the frequency deviation, i.e., the signal coming through the branch 13, 14, which is a measure of the distance which the fuse is from the target. These signals are applied when they exceed predetermined threshold values such that the flip-flop is opened by the signals applied to the one input and is ultimately triggered by the signal applied to the other input, thereby to cause detonation of the explosive charge.

Figure 4:
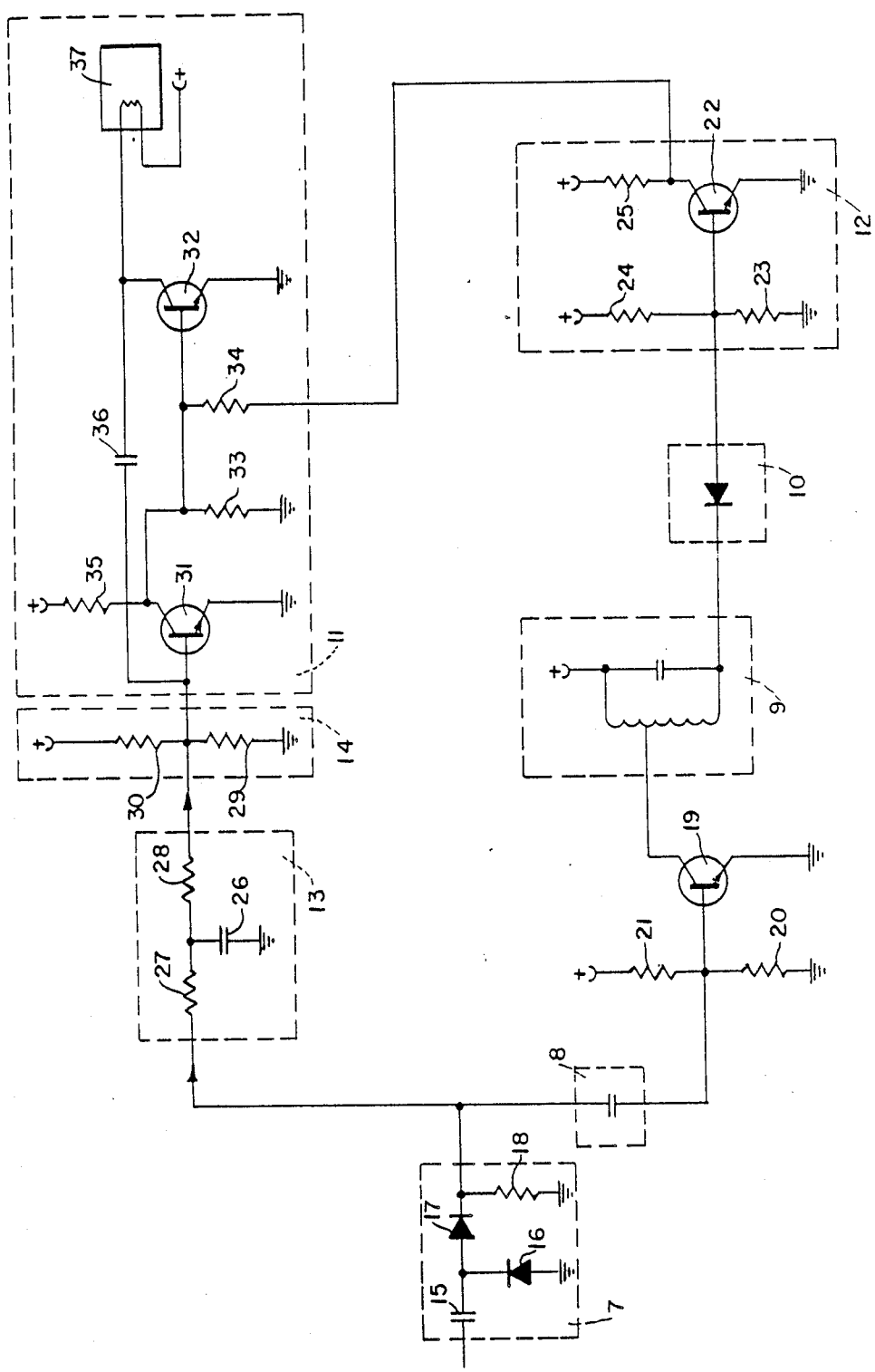
FIG. 4 is a circuit diagram of part of the circuitry shown in FIG. 3.

FIG. 4 shows in more detail a part of the diagram of FIG. 3 for a better understanding of a preferred embodiment according to FIG. 3.

The counter 7 contains the capacitor 15 which is charged and discharged by means of the diodes. The output signal of the counter 7 appears across the resistor 18.

The pulse repetition frequency is applied via the disconnect capacitor 8 to an amplifier, which is not shown in FIG. 3 and which contains the transistor 19 biased by means of the resistors 20 and 21. The collector of the transistor 19 is connected via the passed-band filter circuit 9 to the rectifier 10. As soon as the d.c. voltage at the input of stage 12 exceeds a predetermined voltage the transistor 22, which is normally conducting due to the potentials applied to it via the resistors 23, 24 and 25, becomes nonconductive; thereby the potential of its collector rises and prepares the detonating circuit 11 for firing.

The smoothing element 13 consists of the capacitor 26 and the resistors 27 and 28; the threshold 14 consists of the resistors 29 and 30, respectively.

The detonating circuit 11 consists of two transistors 31 and 32, respectively, which are connected to each other to form a flip-flop circuit by means of the circuit elements 33, 34, 35 and 36. When the flip-flop is open, a current flows through the transistor 32 via the detonating element 37 which detonates the explosive charge.

Figure 5:
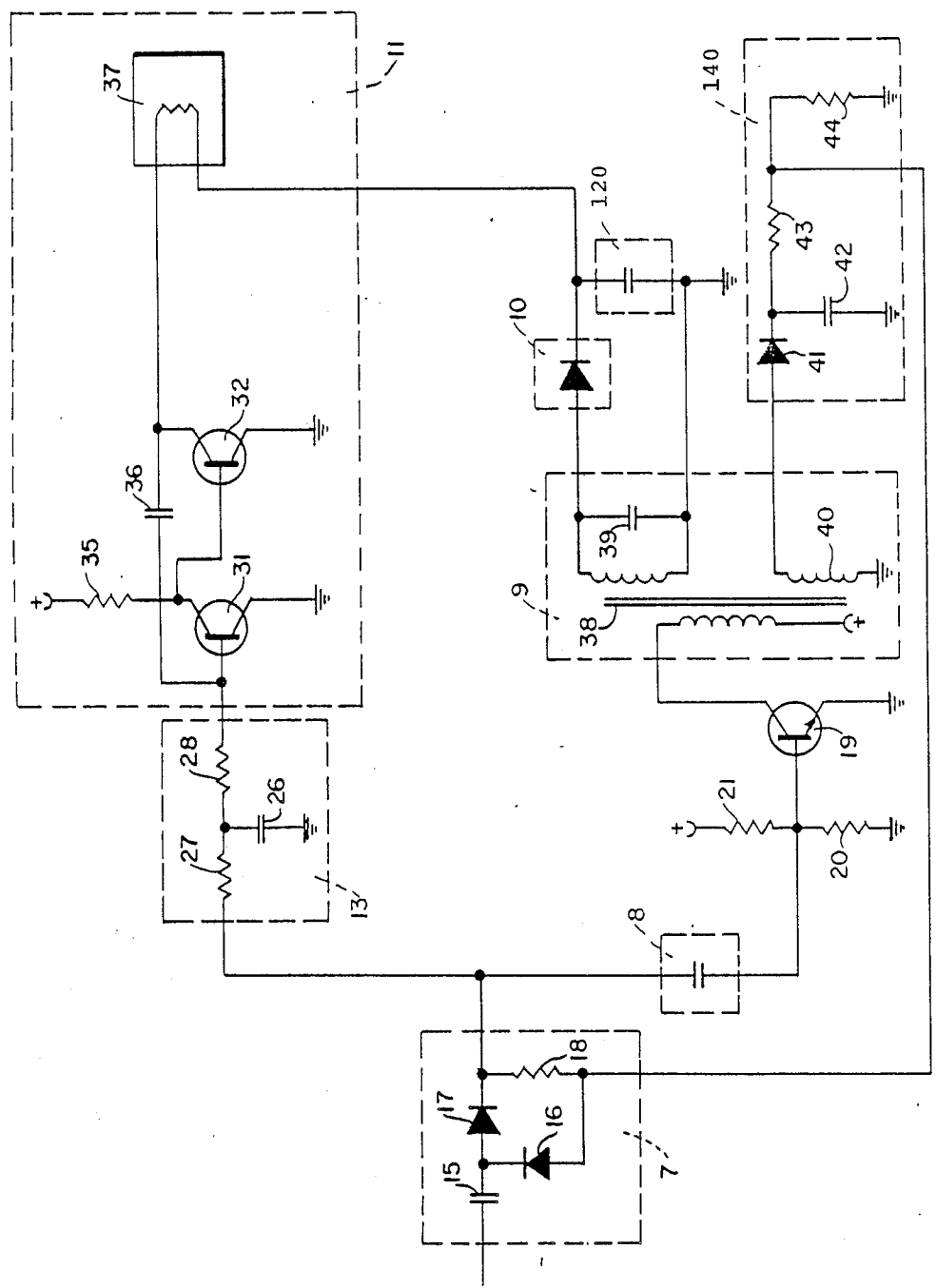
FIG. 5 is a circuit diagram of another embodiment of the present invention.

FIG. 5 shows a part of another preferred embodiment according to the invention. This Figure may be taken in conjunction with the figures described above. Therefore the description of the elements which are likewise shown in the previous Figures is not repeated.

The pass-band filter 9 in the embodiment according to FIG. 5 contains a transformer 38 which by means of capacitor 39 is tuned to the wobble frequency. The transistor 19 in conjunction with the tuned transformer 38 amplifies the pulse repetition frequency to such an amplitude that the detonating capacitor 120 which is connected to the transformer via the rectifier 10 is charged to such a value that the detonating element 37 detonates the explosive charge when the transistor 32 is open.

In the embodiment according to FIG. 5 the smoothing element 13, which consists of the circuit elements 26, 27 and 28, is directly connected to the detonating circuit 11, which as in the embodiment according to FIG. 4 is a flip-flop circuit.

The transformer 38 comprises a further winding 40 which is connected to the threshold stage 140. Stage 140 comprises the diode 41, the capacitor 42 and the resistors 43 and 44.

The junction point of the resistors 43 and 44 is connected to the counter 7.

When the voltage across the resistor 18 of the counter 7 exceeds a predetermined value—which depends upon the distance of the fuse relative to the target at which the fuse is intended to detonate—in addition to the voltage across the resistor 44, the flip-flop circuit of the detonating circuit opens due to its layout. The necessary voltage is applied across the resistor 44 only when the detonating condenser 120 is charged to the detonating voltage; this is due to the fact that the transformer 38 is so heavily loaded during the charge of the detonating condenser that there is insufficient voltage across the winding 40, which is very closely coupled to the other windings of the transformer 38.

It will be understood that the above description of the present invention is susceptible to various modifications, changes, and adaptations, and the same are intended to be comprehended within the meaning and range of equivalents of the appended claims.

What is claimed is:

1. An electronic proximity fuse comprising, in combination:
   (a) means for transmitting frequency-modulated signals and for receiving that portion of the signals which is reflected by a target;
   (b) a detonating circuit having two inputs and an output for producing a detonating signal only when input signals appear at each of said inputs; and
   (c) means connected to said transmitting and receiving means for producing a first signal which is proportional to the amount, averaged over the frequency-modulation period, by which the frequency of the received signal differs from the frequency of the signal transmitted at the instant of reception, and a second signal which is proportional to the amount of the frequency fluctuations of the frequency deviation about the averaged amount, and for applying said two signals, when each respective amount represented thereby exceeds a respective predetermined minimum value, as input signals, to said inputs, respectively, of said detonating circuit, whereby a detonating signal is produced only when a projectile carrying the fuse, while such projectile travels toward the target, is at a predetermined distance from the target.

2. A proximity fuse as defined in claim 1 wherein said transmitting and receiving means comprise a modulation signal generator for generating a triangular signal.

3. A proximity fuse as defined in claim 2, wherein said transmitting and receiving means further comprise a self-oscillating mixer stage.

4. A proximity fuse as defined in claim 3, wherein said transmitting and receiving means further comprise a capacitance diode connected to said signal generator and to said mixer stage for wobbling the transmission frequency of said transmitting and receiving means.

5. A proximity fuse as defined in claim 1, wherein said means (c) comprise means connected to the output of said transmitting and receiving means for limiting the amplitude of said output.

6. A proximity fuse as defined in claim 1, wherein said means (c) comprise means connected to the output of said transmitting and receiving means for producing constant amplitude output signals whose frequency is proportional to the frequency of the output of said transmitting and receiving means.

7. A proximity fuse as defined in claim 1 wherein said means (c) comprise counting means for determining the frequency of the output of said transmitting and receiving means.

8. A proximity fuse as defined in claim 7 wherein said means (c) further comprise a filter circuit connected to the output of said counter for producing a signal which is a function of the speed of the projectile carrying the fuse relative to the target.

9. A proximity fuse as defined in claim 8 wherein said filter circuit comprises a pass-band filter.

10. A proximity fuse as defined in claim 7 wherein said means (c) further comprise a smoothing element connected to the output of said counter and a threshold element connected to the output of said smoothing element.

11. A proximity fuse as defined in claim 1 wherein said detonating circuit comprises a flip-flop having two combined signal inputs constituting said two inputs, respectively, one of said inputs serving to receive a signal for preparing the opening of said flip-flop which is normally operated in blocked condition, the other of said inputs serving as an input for receiving a signal which triggers said flip-flop into the open condition, and wherein means are provided for applying said second signal to said one input and said first signal to said other input, whereby said flip-flop is first nearly unblocked by the signal applied to said one input and only thereafter triggered into the open condition by the signal applied to said other input.

12. An electronic proximity fuse comprising, in combination:
   (a) an antenna circuit;
   (b) a capacitance diode connected to said antenna circuit;
   (c) a modulation signal generator connected to said capacitance diode;
   (d) a self-oscillating mixer stage connected to said capacitance diode;
   (e) a low-frequency amplifier having its input connected to said self-oscillating mixer stage;
   (f) an amplitude limiting circuit having its input connected to the output of said amplifier;
   (g) a frequency counter having its input connected to the output of said limiting circuit;
   (h) a disconnect capacitor having its input connected to the output of said counter;
   (i) a filter circuit having its input connected to the output of said capacitor;
   (j) a rectifier having its input connected to the output of said filter circuit;
   (k) a smoothing element having its input connected to said output of said counter;
   (l) a threshold element having its input connected to the output of said smoothing element; and
   (m) a detonating circuit having two inputs and an output for producing a detonating signal only when input signals appear at each of said inputs, one of said inputs being connected to the output of said rectifier and the other of said inputs being connected to the output of said threshold element.

13. An electronic proximity fuse as defined in claim 12, further comprising an amplifying input circuit interposed between said output of said rectifier and said one input of said detonating circuit.

14. An electronic proximity fuse as defined in claim 12 wherein said detonating circuit comprises a flip-flop which is normally in blocked condition, said one input serving as an input which, upon receipt of a signal, changes the state of said flip-flop from blocked to nearly an unblocked condition and said other input serving as an input which, upon receipt of a signal and with said flip-flop being in the nearly unblocked condition, triggers said flip-flop, into the open condition thereby to produce an output signal.

15. A proximity fuse as defined in claim 1, wherein so much of said means (c) which produce said second signal comprise: means for producing a d.c. voltage depending upon said second signals, storage means and means for charging said storage means to a predetermined value depending upon the voltage necessary for detonating the detonating elements of the fuse.

16. A proximity fuse as defined in claim 15 wherein a part of said d.c. voltage is combined with said first signal.

17. A proximity fuse as defined in claim 11 wherein said flip-flop is a Schmitt-trigger circuit.

18. An electronic proximity fuse, comprising, in combination:
   (a) an antenna circuit;
   (b) a capacitance diode connected to said antenna circuit;
   (c) a modulation signal generator connected to said capacitance diode;
   (d) a self-oscillating mixer stage connected to said capacitance diode;
   (e) a low-frequency amplifier having its input connected to said self-oscillating mixer stage;
   (f) an amplitude limiting circuit having its input connected to the output of said amplifier;
   (g) a frequency counter having its input connected to the output of said limiting circuit;
   (h) a disconnect capacitor having its input connected to the output of said counter;
   (i) an amplifying filter circuit having its input connected to the output of said disconnect capacitor, said amplifying filter having first and second outputs;
   (j) a rectifier having its input connected to said first output of said amplifying filter;
   (k) a detonating capacitor connected across the output of said rectifier;
   (l) a threshold element having its input connected to said second output of said amplifying filter, the output of said threshold element being connected to said counter;
   (m) a smoothing element having its input connected to said output of said frequency counter; and
   (n) a detonating circuit having two inputs and an output for producing a detonating signal only when input signals appear at each of said two inputs, one of said detonating circuit inputs being connected to the output of said smoothing element and the other of said detonating circuit inputs being connected to the output of said rectifier.

19. An electronic proximity fuse as defined in claim 18 wherein said amplifying filter incorporates a transformer tuned to a wobble frequency and having two closely coupled secondary windings constituting, respectively, said first and second outputs of said amplifying filter.

* * * * *